United States Patent
McEldowney

(10) Patent No.: US 11,431,884 B2
(45) Date of Patent: Aug. 30, 2022

(54) POLARIZATION CAPTURE DEVICE FOR IDENTIFYING FEATURE OF OBJECT

(71) Applicant: Meta Platforms Technologies, LLC, Menlo Park, CA (US)

(72) Inventor: Scott Charles McEldowney, Redmond, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/016,280

(22) Filed: Sep. 9, 2020

(65) Prior Publication Data

US 2021/0084206 A1 Mar. 18, 2021

Related U.S. Application Data

(60) Provisional application No. 62/901,260, filed on Sep. 16, 2019, provisional application No. 62/900,909, filed on Sep. 16, 2019.

(51) Int. Cl.
*H04N 5/225* (2006.01)
*G06V 10/60* (2022.01)
*H04N 13/254* (2018.01)

(52) U.S. Cl.
CPC .......... *H04N 5/2258* (2013.01); *G06V 10/60* (2022.01); *H04N 5/2256* (2013.01); *H04N 13/254* (2018.05)

(58) Field of Classification Search
CPC .. H04N 5/2258; H04N 5/2256; H04N 13/254; H04N 13/25; H04N 13/257;
(Continued)

(56) References Cited

U.S. PATENT DOCUMENTS

2018/0100731 A1* 4/2018 Pau ..................... H04N 9/04555
2019/0369059 A1* 12/2019 Samokrutov ........ G01N 29/449
(Continued)

FOREIGN PATENT DOCUMENTS

WO 2019003384 A1 1/2019
WO 2019089049 A1 5/2019

OTHER PUBLICATIONS

Wetzel, K., et al., "Polarization cameras take the stress out of material analysis," available online at URL: https://www.imperx.com/wp-content/uploads/2018/10/Polarization-cameras-take-the-stress-out-of-materials-analysis_Imperx_wp_f.pdf, retrieved on Sep. 22, 2020 (7 pages).

(Continued)

*Primary Examiner* — Nasim N Nirjhar
(74) *Attorney, Agent, or Firm* — Millburn IP PLLC

(57) ABSTRACT

A device includes a first polarized image sensor configured to capture first image data relating to an object from a first perspective. The device also includes a second polarized image sensor configured to capture second image data relating to the object from a second perspective different from the first perspective. The device further includes a processor configured to obtain at least one of polarization information or depth information of the object based on at least one of the first image data or the second image data, and to extract a feature of the object based on the at least one of the polarization information or the depth information.

19 Claims, 9 Drawing Sheets

(58) Field of Classification Search
CPC .. H04N 13/271; G06K 9/4661; G06K 9/2036; G06K 9/00771; G06K 9/00201; G06K 9/209; G06K 9/6278; G02B 2027/0178; G02B 27/0172; G01J 4/04
See application file for complete search history.

(56) References Cited

U.S. PATENT DOCUMENTS

2020/0175297 A1    6/2020  Ogasawara
2021/0058604 A1*   2/2021  Nakata .................. G03B 35/08

OTHER PUBLICATIONS

International Search Report and Written Opinion dated Dec. 16, 2020, in International Application No. PCT/US2020/051015, filed on Sep. 16, 2020 (16 pages).
Liu, H.-Z., et al. "Non-uniformity calibration for MWIR polarization imagery obtained with integrated microgrid polarimeters," Proceedings of SPIE, vol. 10255, Mar. 8, 2016, pp. 102554D-1 to 102554D-6 (6 pages).
International Preliminary Report on Patentability for International Application No. PCT/US2020/051015, dated Mar. 31, 2022, 14 pages.

* cited by examiner

POLARIZATION CAPTURE DEVICE FOR IDENTIFYING FEATURE OF OBJECT

CROSS-REFERENCE TO RELATED APPLICATIONS

This application claims the benefit of priority to U.S. Provisional Patent Application No. 62/901,260, filed on Sep. 16, 2019, and to U.S. Provisional Patent Application No. 62/900,909, filed on Sep. 16, 2019. The contents of the above-referenced applications are incorporated by reference in their entirety.

TECHNICAL FIELD

The present disclosure generally relates to imaging technologies and, more specifically, to a polarization capture device for identifying a feature of an object.

BACKGROUND

An object may produce polarized features that are related to the nature of the object when reflecting, diffracting, transmitting, refracting, and/or scattering an incoming light. Therefore, polarization information may be used to determine various properties of the object. Polarization cameras have been used to capture images of objects including polarization information.

SUMMARY OF THE DISCLOSURE

One aspect of the present disclosure provides a device including a first polarized image sensor configured to capture first image data relating to an object from a first perspective. The device also includes a second polarized image sensor configured to capture second image data relating to the object from a second perspective different from the first perspective. The device further includes a processor configured to obtain at least one of polarization information or depth information of the object based on at least one of the first image data or the second image data, and to extract a feature of the object based on the at least one of the polarization information or the depth information.

Another aspect of the present disclosure provides a device including a polarized image sensor configured to obtain image data relating to an object illuminated by a structured light. The device also includes a processor configured to obtain at least one of polarization information or depth information of the object based on the image data, and to extract a feature of the object based on the at least one of the polarization information or the depth information.

Another aspect of the present disclosure provides a method including capturing first image data relating to an object from a first perspective. The method also includes capturing second image data relating to the object from a second perspective different from the first perspective. The method also includes obtaining at least one of polarization information or depth information of the object based on at least one of the first image data or the second image data. The method further includes extracting a feature of the object based on the at least one of polarization information or depth information of the object.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1:
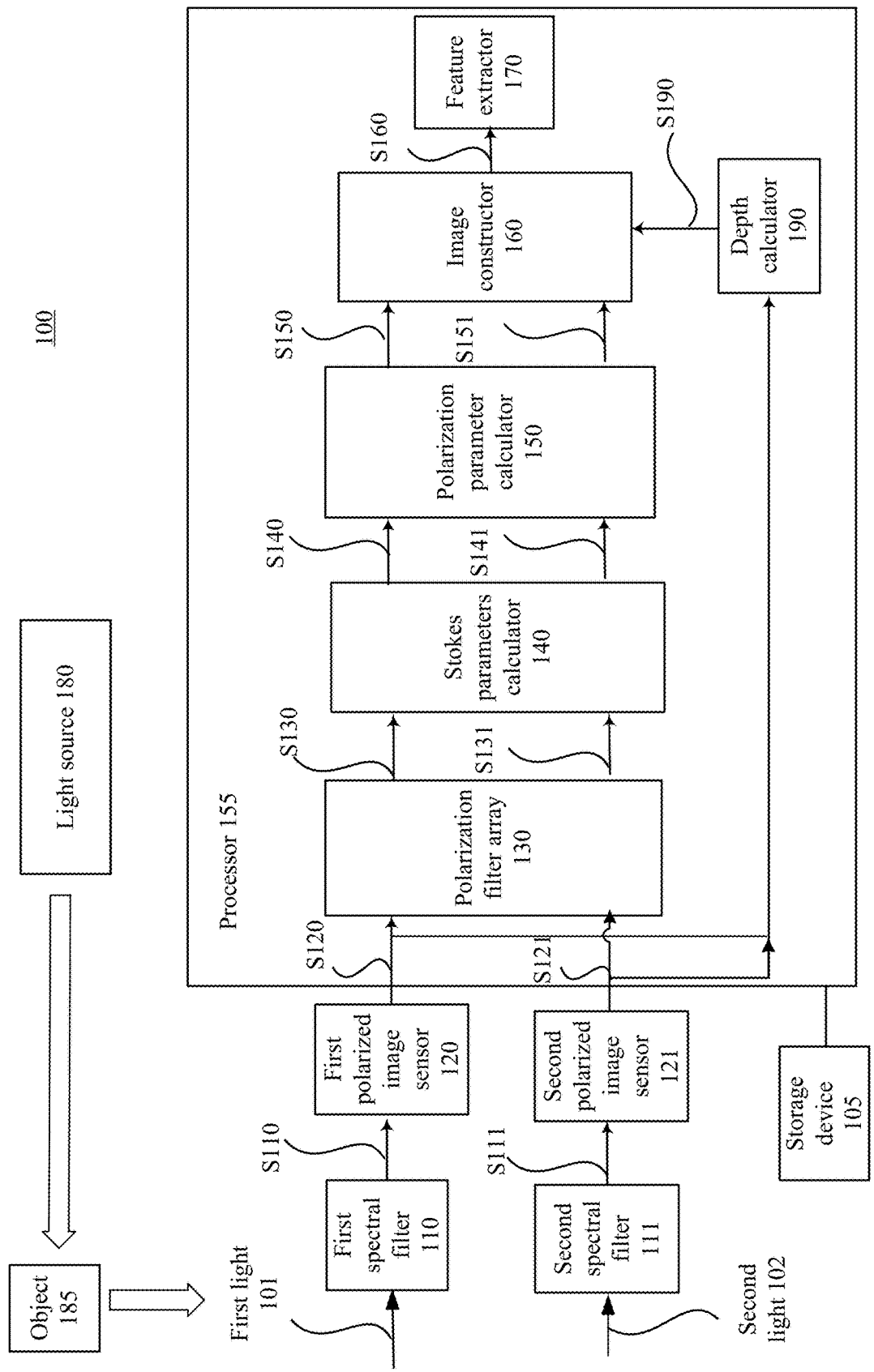
FIG. 1 illustrates a schematic diagram of a polarization capture device, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light beam output from one optical element may be directly or indirectly received by the other optical element. An optical series refers to optical positioning of a plurality of optical elements in a light beam path, such that a light beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The present disclosure provides a polarization capture device or system for capturing images (or image data) of an object that include polarization information relating to the object, and for identifying features or characteristics of the object based on the polarization information included in the images (or image data). In some embodiments, the polarization capture device or system may include two or more spaced-apart polarized image sensors configured to capture two or more images of an object, or a scene including the object, from two or more different perspectives. In some embodiments, the polarized image sensors may be near infrared ("NIR") polarized image sensors configured to capture monochromatic images of the object from different (e.g., slightly different) perspectives. The polarization capture device may also include a processor configured to obtain (e.g., calculate) the polarization information and/or depth information based on the two or more images (or image data corresponding to the images). The processor may further extract features or characteristics of the object based on the obtained polarization information and/or depth information. The features or characteristics of the object may include the shape, the size, the texture, the surface orientation, the surface roughness, the surface orientation, the material of the object, etc. In addition, properties of the material of the object may also be identified, such as optical properties (e.g., the reflection, refraction, diffraction, transmission, and/or scattering), mechanical properties (e.g., stresses, flaws or defects, etc.), acoustic properties (e.g., sound absorption coefficient, acoustic impedance, noise reduction coefficient, sound transmission class, A-weighted sound level scale, etc.).

In some embodiments, the polarization capture device or system may include a polarized image sensor configured to obtain image data relating to an object illuminated by a structured light. The polarization capture device may also include a processor configured to obtain at least one of a polarization parameter or depth information of the object based on the image data, and to extract a feature of the object based on at least one of the polarization parameter or the depth information. In some embodiments, the polarization capture device may also include a light source configured to emit the structured light.

FIG. 1 illustrates a schematic diagram of a device or system 100 according to an embodiment of the present disclosure. The device 100 may be referred to as a polarization capture device 100. The polarization capture device 100 may be configured to capture images of an object, process image data of the captured images, and obtain features and/or characteristics of the object based on the processed image data. In some embodiments, the polarization capture device 100 may also identify properties of the material of the object, such as optical properties, mechanical properties, acoustic properties, etc. As shown in FIG. 1, the polarization capture device 100 may include a first spectral filter 110, a first polarized image sensor 120, a second spectral filter 111, a second polarized image sensor 121, a processor 155, and a storage device 105. The polarization capture device 100 may include additional components, which are not limited by the present disclosure.

An object 185 may be illuminated by a suitable light source 180, e.g., a natural light source (e.g., the sun), or a man-made light source (e.g., a light-emitting diode ("LED"), an organic light-emitting diode ("OLED"), or a laser diode), etc. The object 185 may reflect, refracted, transmitted, diffract, scatter the illuminated light. In some embodiments, the object 185 may affect the polarization of the light incident onto the object 185, e.g., partially polarize a portion of the light if the incident light is an unpolarized light. The reflection, refraction, transmission, diffraction, and scattering of the object may be collectively referred to as deflection for discussion convenience. The polarization capture device 100 may be configured to process the light from the object 185.

The first spectral filter 110 and the second spectral filter 111 may be configured to filter lights having wavelengths outside of a predetermined wavelength band or range (or referred to a predetermined spectrum). For example, at least one (e.g., each) of the first spectral filter 110 or the second spectral filter 111 may be a near infrared ("NIR") filter configured to filter (e.g., block) lights with wavelengths outside of a predetermined NIR wavelength band. That is, the first spectral filter 110 and the second spectral filter 111 may only allow lights having wavelengths within the predetermined NIR wavelength band to pass through.

Figure 7:
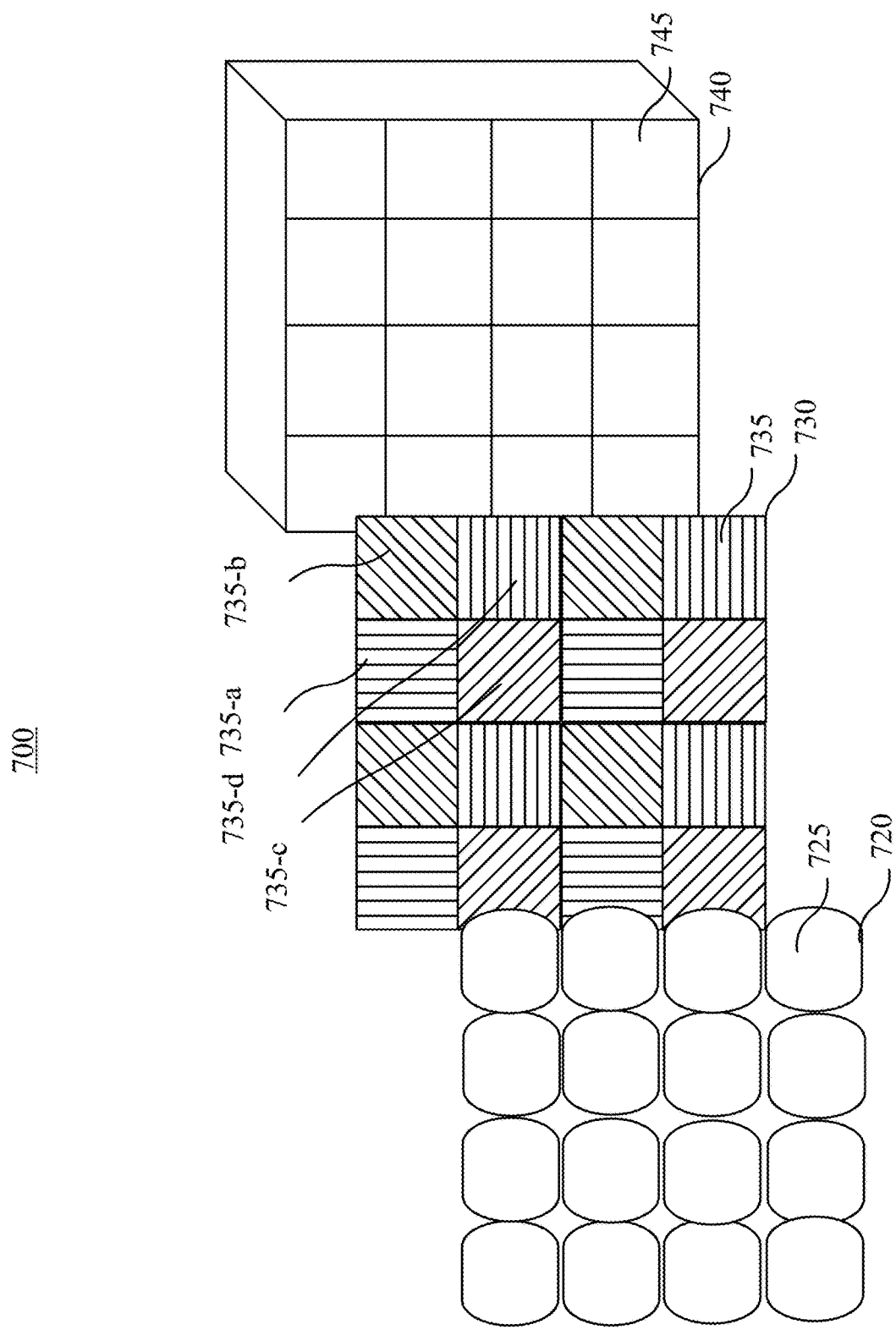
FIG. 7 is a schematic diagram of a pixelated polarized camera, according to an embodiment of the present disclosure.

The first polarized image sensor 120 and the second polarized image sensor 121 may be configured to capture images or image data of the object 185 with polarization information and depth information. An example polarized image sensor is shown in FIG. 7, which will be described below. In some embodiments, at least one (e.g., each) of the first polarized image sensor 120 or the second polarized image sensor 121 may be a polarized monochrome (or "mono") image sensor configured to capture monochromatic images of the object 185. For example, the at least one (e.g., each) of the first polarized image sensor 120 or the second polarized image sensor 121 may be an NIR polarized image sensor configured to capture monochromatic images based on lights in the NIR range. In some embodiments, the first polarized image sensor 120 and the second polarized image sensor 121 may be included in two separate cameras, and may be disposed apart from one another. The separate cameras may include separate sets of one or more lenses optically coupled with the first polarized image sensor 120 or the second polarized image sensor 121. In some embodiments, the first polarized image sensor 120 and the second polarized image sensor 121 may be included in a single camera, and may be disposed apart from one another. The single camera may include separate sets of one or more lenses optically coupled with the first polarized image sensor 120 and the second polarized image sensor 121. The separate sets of one or more lenses may be configured to receive lights from the object 185 from different perspectives (or directions). In some embodiments, the lights may be reflected, scattered, diffracted, transmitted, and/or refracted by the object 185 toward the set of lenses. The separate sets of one or more lenses may direct the received lights toward the first polarized image sensor 120 and the second polarized image sensor 121, respectively. In some embodiments, the separate cameras or the single camera may also include the first spectral filter 110 and the second spectral filter 111. In some embodiments, the first spectral filter 110 may be disposed between the first polarized image sensor 120 and a first set of one or more lenses, and the second spectral filter 111 may be disposed between the second polarized image sensor 120 and a second set of one or more lenses.

In some embodiments, as shown in FIG. 1, the processor 155 may include a polarization filter array 130, a Stokes parameter calculator 140, a polarization parameter calculator 150, an image constructor 160, a depth calculator 190, and a feature extractor 170. In some embodiments, the processor 155 may include additional elements or some elements in the processor 155 may be omitted. For example, in some embodiments, the polarization filter array 130 may be omitted. The processor 155 may also be referred to as a signal processor. The processor 155 may include one or more hardware and/or software modules, computing units, circuits, etc. For example, the processor 155 may be any suitable processor, such as a central processing unit ("CPU"), a microprocessor, a graphic processing unit ("GPU"), a digital signal processor ("DSP"), etc. In some embodiments, each of the polarization filter array 130, the Stokes parameter calculator 140, the polarization parameter calculator 150, the image constructor 160, the depth calculator 190, and the feature extractor 170 may include hardware components (e.g., circuit, processing unit, gate, etc.), software components (e.g., a software module, instructions or codes executable by a processor, etc.), or a combination thereof.

The processor 155 may be configured to process the image data captured by the polarized image sensors 120 and 121 time sequentially or simultaneously to obtain polarization information and/or depth information relating to the object 185. In some embodiments, the polarization information may include at least one of a Stokes parameter, a degree of linear polarization ("DOLP"), or an angle of linear polarization ("AOLP"). In some embodiments, the polarization information of the object 185 may include other parameters, such as a degree of polarization ("DOP"), an angle of polarization ("AOP"), a degree of circular polarization ("DOCP"), etc.

In some embodiments, the polarization filter array 130 may include an array of four (or any other suitable number of) polarization filters configured to filter image data based on predetermined polarization orientations or directions. In some embodiments, the polarization filter array 130 may include digital and/or analog filters. For example, the polarization filter array 130 may be digital filters configured to process the image data output from the polarized image sensors 120 and 121. In some embodiments, the Stokes parameter calculator 140 may be configured to calculate one or more Stokes parameters ($S_0$, $S_1$, $S_2$, and/or $S_3$) based on the image data output from the polarization filter array 130. In some embodiments, the Stokes parameter calculator 140 may be configured to calculate the Stokes polarization information (Stokes parameters) for each pixel of the captured images.

In some embodiments, based on the calculated Stokes parameters ($S_0$, $S_1$, $S_2$, and/or $S_3$), the polarization parameter calculator 150 may be configured to calculate one or more polarization parameters, such as the DOLP, the AOLP, the DOP, the AOP, the DOCP. For illustrative purposes, the DOLP and AOLP are used as example polarization parameters in the following descriptions. In some embodiments, the polarization parameter calculator 150 may be configured to calculate the polarization parameters based on the calculated Stokes parameters ($S_0$, $S_1$, $S_2$, and/or $S_3$) for each pixel of the captured images.

The DOLP value may depend on a surface condition of the object and/or an angle of reflection from the object. For example, the incoming light reflected from a specular surface may have a high DOLP value. As such, the DOLP value may indicate, or may be used for estimating, a surface roughness, a texture type, or a surface scratch detection. In some embodiments, the DOLP value may indicate, or may be used to determine, whether an object is a natural object or a man-made object, because most natural objects are characterized by low DOLP values and most man-made objects, such as plastic objects, generally have high DOLP values. The AOLP value may provide direction information of a reflection plane of the object. Therefore, the AOLP value may be used for shape detection, distortion detection, or object recognition.

In some embodiments, the depth calculator 190 may be configured to calculate a depth (or depth information) of the object based on the two sets of raw image data output from the first polarized image sensor 120 and the second polarized image sensor 121, respectively. In some embodiments, the image constructor 160 may be configured to construct one or more images based on the calculated polarization parameters and/or depth information. For example, the image constructor 160 may be configured to construct an DOLP image, an AOLP image, a 3D image, or any combination thereof.

In some embodiments, the feature extractor 170 may be configured to extract or identify features or characteristics of the object 185 based on the calculated polarization parameters, the depth information, and/or the constructed images. For example, the feature extractor 170 may extract the features of the object based on image data (the DOLP values and/or the AOLP values) output from the polarization parameter calculator 150, the depth information generated by the depth calculator 190, and/or the images constructed by the image constructor 160.

Referring to FIG. 1, the light source 180 may be configured to emit a light to illuminate the object 185. The light emitted by the light source 180 may have a wavelength range at least covering predetermined wavelength bands or ranges (or predetermined spectrums) of the polarized image sensor 120 and the second polarized image sensor 121. In some embodiments, the light source 180 may be a natural light source (e.g., the sun, etc.) or a man-made light source (e.g., a light-emitting diode ("LED"), an organic light-emitting diode ("OLED"), or a laser diode, etc.). When the light source 180 is a natural light source, the light source 180 may not be a part of the polarization capture device 10. When the light source 180 is a man-made light source, the light source 180 may or may not be a part of the polarization capture device 10.

In some embodiments, the light emitted by the light source 180 may be reflected, scattered, diffracted, transmitted, and/or refracted by the object 185. In some embodiments, the light emitted by the light source 180 may be partially reflected, scattered, diffracted, transmitted, or refracted by the object 185 and partially absorbed by the object 185. In some embodiments, the light emitted by the light source 180 may be an unpolarized light, and the object 185 may reflect, scatter, diffract, transmit, and/or refract the unpolarized light as a partially polarized light that contains information of the features and characteristics of the object 185.

A first light 101 from the object 185 and a second light 102 from the object 185 may be received by the first spectral filter 110 and the second spectral filter 111, respectively. The first light 101 and the second light 102 from the object 185 may be received by separate sets of one or more lenses in different perspectives (or directions), and be guided by the separate sets of lenses to the first spectral filter 110 and the second spectral filter 111, respectively. The first spectral filter 110 and the second spectral filter 111 may substantially transmit a portion of the first light 101 and the second light 102, when the portion is associated with wavelengths within the predetermined wavelength band or range (or the predetermined spectrum) of the first spectral filter 110 and the second spectral filter 111, respectively. The first spectral filter 110 and the second spectral filter 111 may substantially filter out (e.g., block, absorb) the remaining portion of the received first light 101 and the second light 102, when the remaining portion is associated with wavelengths outside of the predetermined wavelength band or range (or the predetermined spectrum) of the first spectral filter 110 and the second spectral filter 111.

In some embodiments, the first spectral filter 110 may be a band-pass filter associated with a first predetermined wavelength range (e.g., allowing lights with wavelengths within the first predetermined wavelength range to pass through). The second spectral filter 111 may be a band-pass filter associated with a second predetermined wavelength range. The first predetermined wavelength range may be the same as or may be different from the second predetermined wavelength range. In some embodiments, the first predetermined wavelength range may at least partially overlap the second predetermined wavelength range. For example, when the first spectral filter 110 and the second spectral filter 111 are NIR filters with the predetermined spectrum in the NIR range, the first spectral filter 110 and the second spectral filter 111 may substantially filter out (e.g., block) portions of the first light 101 and the second light 102 that are associated with wavelengths outside of the predetermined NIR wavelength range, and substantially transmit portions of the first light 101 and the second light 102 that are associated with wavelengths within the first predetermined MR wavelength range and the second predetermined NIR wavelength range, respectively.

The first spectral filter 110 and the second spectral filter 111 may output a light S110 and a light S111, respectively. The light S110 may be associated with a first predetermined wavelength range. The light S111 may be associated with a second predetermined wavelength range. For example, when the first spectral filter 110 and the second spectral filter 111 are NIR filters, the light S110 and the light S111 may be NIR lights (i.e., lights with wavelengths in NIR wavelength ranges). The light S110 and the light S111 may be received by the first polarized image sensor 120 and the second polarized image sensor 121, respectively. Each of the first polarized image sensor 120 and the second polarized image sensor 121 may capture or obtain a set of image data based on the corresponding light (e.g., NIR lights) S110 or S111 independently, and may generate and output a set of polarized image data S120 or S121. The polarized image data S120 or S121 generated based on the corresponding NIR lights S110 or S111 may be NIR monochromatic (or mono) image data, rather than red green blue ("RGB") image data. In some embodiments, the polarized image data S120 and S121 may be referred to as raw image data. The image data S120 and S121 may be associated with the lights 101 and 102 from the object in different perspectives (or directions).

The polarized image data S120 and S121 may be received and processed by the processor 155. For example, the polarized image data S120 and S121 may be processed by the polarization filter array 130. In some embodiments, the polarization filter array 130 may be a digital or analog filter array. For example, the polarization filter array 130 may be implemented as a digital computation module or a software component. In some embodiments, the polarization filter array 130 may include an array of a number of (e.g., at least four) digital polarization filters, including, for example, at least one horizontal filter configured to output data associated with a horizontal linear polarization (e.g., a linear polarizer with an orientation of 0 degree), at least one vertical filter configured to output data associated with a vertical linear polarization, at least one 45-degree filter configured to output data associated with a 45-degree linear polarization, and at least one 135-degree filter configured to output data associated with a 135-degree linear polarization. For example, the horizontal filter may be a digital linear polarizer with a transmission axis orientation of 0 degree, the vertical filter may be a digital linear polarizer with a transmission axis orientation of 90 degrees, the 45-degree filter may be a digital linear polarizer with a transmission axis orientation of 45 degrees, and the 135-degree filter may be a digital linear polarizer with a transmission axis orientation of 135 degrees (or −45 degrees). The number of the polarization filters may be any suitable number, and the transmission axes orientations of the polarization filters may be any suitable orientations. The polarization filter array 130 may output filtered data S130 and S131, respectively. In some embodiments, the filtered data S130 and S131 may be polarized image data (e.g., polarized mono image data).

The filtered data S130 and S131 may be processed by the Stokes parameter calculator 140. In some embodiments, the Stokes parameter calculator 140 may be configured to calculate optical power values $P_H$, $P_V$, $P_{45}$, and $P_{135}$ based on each of the filtered data S130 and S131. The optical power values $P_H$, $P_V$, $P_{45}$, and $P_{135}$ may indicate the optical power of components of the light corresponding to the horizontal polarization, vertical polarization, 45-degree polarization, and 135-degree polarization, respectively. In some embodiments, the Stokes parameter calculator 140 may also calculate the optical power values $P_R$, which is the optical power of a right-handed circularly polarized component of the light, and $P_L$, which is the optical power of a left-handed circularly polarized component of the light.

The Stokes parameter calculator 140 may be configured calculate one or more Stokes parameters (e.g., $S_0$, $S_1$, $S_2$, and/or $S_3$) based on the calculated optical power values. In some embodiments, the Stoke parameters $S_0$, $S_1$, $S_2$, $S_3$ may be calculated according to the following equation (1) based on the optical powers:

$$S = \begin{bmatrix} I \\ Q \\ U \\ V \end{bmatrix} = \begin{bmatrix} S_0 \\ S_1 \\ S_2 \\ S_3 \end{bmatrix} = \begin{bmatrix} P_H + P_V \\ P_H - P_V \\ P_{45} - P_{135} \\ P_R - P_L \end{bmatrix}. \quad (1)$$

In equation (1), the Stokes parameter $S_0=P_H+P_V$, which may indicate the total irradiance of the light. The Stokes parameter $S_1=P_H-P_V$, which may indicate the tendency of horizontal linear polarization. The Stokes parameter $S_2=P_{45}-P_{135}$, which may indicate the tendency of the 45-degree linear polarization. The Stokes parameter $S_3=P_R-P_L$, which may indicate the tendency of the light to be circularly polarized.

The Stokes parameter calculator 140 may output data $S_{140}$ and $S_{141}$. The data $S_{140}$ and $S_{141}$ may include the Stokes parameters. The polarization parameter calculator 150 may calculate the degree of linear polarization ("DOLP") values and the angle of linear polarization ("AOLP") values based on the one or more of the Stokes parameters $S_0$, $S_1$, and/or $S_2$. In some embodiments, the DOLP values and the AOLP values may be respectively calculated according to the following equations (2) and (3):

$$\text{DOLP} = \sqrt{S_1^2 + S_2^2}/S_0 \quad (2)$$

$$\text{AOLP} = (½) * \arctan(S_2/S_1) \quad (3)$$

The polarization parameter calculator 150 may output data S150 and S151. The data S150 and S150 may be referred to as polarization parameter data (or data sets). At least one (e.g., each) of the polarization parameter data S150 and S151 may include one or more DOLP values and/or one or more AOLP values.

In some embodiments, as shown in FIG. 1, the polarized image data S120 and S121 (which may also be referred to as raw image data S120 and S121) output from the first polarized image sensor 120 and the second polarized image sensor 121 may also be processed by the depth calculator 190. The depth calculator 190 may be configured to calculate depth information or a depth of the object 185 based on disparity information or parallax information of the object 185 in the two sets of image data S120 and S121. The disparity information or parallax information may be based on a difference (e.g., a location difference) or various distances of the object 185 in the two images represented by the two sets of image data S120 and S121. The depth calculator 190 may output the depth or the depth information (or depth data) S190 to the feature extractor 170.

In some embodiments, the image constructor 160 may be configured to constructor one or more images based on raw image data S120 and S121, the data S140 and S141 that include Stokes parameters, the polarization parameter data S150 and S151, and/or the depth data S190. For example, the image constructor 160 may construct $S_0$ images, $S_1$ images, $S_2$ images, and/or $S_3$ images of the object 185 based on the data S140 and/or S141. In some embodiments, the image constructor 160 may construct an AOLP image of the object 185 and/or an DOLP image of the object 185 based on the polarization parameter data S150 and/or S151. In some embodiments, the image constructor 160 may construct a 3D image of the object 185 based on the depth data S190 and the raw image data S120 and S121. In some embodiments, the image constructor 160 may be configured to construct a 3D AOLP image of the object 185 and/or 3D DOLP image of the object 185 based on the polarization parameter data S150 and S151, and the depth data S190. The image constructor 160 may output constructed images (or constructed image data) S160 to the feature extractor 170.

In some embodiments, the feature extractor 170 may extract features or characteristics of the object 185 based on the constructed image data S160 output from the image constructor 160, the polarization parameter data S150 and S151 output from the polarization parameter calculator 150, and/or the depth data S190 output from the depth calculator 190.

The polarization capture device 100 may obtain polarization information and depth information of the object 185 from the captured images of the object 185. The polarization information included in the polarization parameter data S150 and S151 may include the DOLP values and/or the AOLP values. The depth information included in the depth data S190 may be obtained based on the disparity information or the parallax information of the object 185 in two or more captured images of the object 185. The constructed images may include visualized polarization information and/or visualized depth information of the object 185. According to the polarization information and/or depth information of the object 185, various features or characteristics of the object 185, such as the shape, the size, the texture, the surface orientation, the surface roughness, the material of the object 185, etc., may be identified.

Further, properties of the material of the object 185 may also be identified, such as mechanical properties (stresses, flaws or defects), optical properties (e.g., reflection, diffraction, refraction, transmission, and/or scattering properties), and acoustic properties of the material. Example acoustic properties may include sound absorption coefficient, acoustic impedance, noise reduction coefficient, sound transmission class, A-weighted sound level scale, etc. In some embodiments, the feature extractor 170 may identify the material of the object 185 based on the constructed images (e.g., DOLP images, AOLP images, 3D images). In some embodiments, the storage device 105 may store a table or database reflecting a known relationship between materials and DOLP values and/or AOLP values. The feature extractor 170 may compare the calculated DOLP values and/or AOLP values with the table to identify the material of the object 185. In some embodiments, the feature extractor 170 may further identify the acoustic properties of the identified material, for example, by comparing the identified material with a table or database storing a relationship between various known materials and various known acoustic properties. For example, the feature extractor 170 may identify that shape, texture, surface roughness of the object 185, and may determine that the material of the object 185 may be wood based on the identified features. The feature extractor 170 may refer to a table storing various properties of various materials including wood to identify the acoustic properties of the wood material of the object 185. In some embodiments, the identified acoustic properties of the material of the object 185 may be presented to a user through a display.

In some embodiments, small damages or defects of the object 185 that may be difficult to discern with naked eyes may be detected based on the polarization information included in the captured image data. For example, for a mechanical element with a smooth surface, any small damages or defects (e.g., dent) on the surface may be manifested in the DOLP values and/or the AOLP values. The feature extractor 170 may determine the damages or defects directly based on the DOLP values and/or AOLP values, based on the constructed DOLP images and/or AOLP images, or based on the identified surface roughness feature and/or the texture feature of the object 185.

In one embodiment, the information obtained from two raw images (or two sets of image data) S120 and S121 captured by two polarized image sensors 120 and 121 may be used by the feature extractor 170 to extract features or characteristics of the object. Various algorithms may be implemented in the feature extractor 170 to extract the features. In some embodiments, an unsupervised learning method (e.g., a machine learning method) such as a K-means cluster approach may be implemented in the feature extractor 170 to process the images (or image data) based on, e.g., the polarization parameter data S150 and S151 that may include the DOLP values and/or the AOLP values, the depth data S190, and/or the constructed image data S160. In some embodiments, the feature extractor 170 may develop a Euclidean distance map based on a combination of the polarization parameter data S150 and S151 that include the DOLP values and/or the AOLP values, and depth information of the object 185 included in the depth data S190. In some embodiments, the processor 155 may include another computation module configured to obtain the brightness values of each pixel included in the image data S120 and S121. In some embodiments, the AOLP values, the DOLP values, brightness values, and/or depth associated with the object 185 may be independently obtained from two images (or two sets of image data S120 and S121) captured by two polarized image sensors 120 and 121 (or polarized NIR image sensors). Any combination of such information may be input into a machine learning system (e.g., a Convolutional Neural Network ("CNN")) implemented in the feature extractor 170 to extract features or characteristics of the object 185, such as the shape, texture, surface roughness, material, etc.

In some embodiments, the AOLP values may be in the range of [0, 180°], and the DOLP values may be in the range of [0, 1]. In some embodiments, the DOLP value may indicate the percentage of the linear polarization in a light. The depth information of the object 185 may be obtained based on the disparity information or the parallax information of the object 185 in the two sets of image data S120 and S121. In one embodiment, the polarization capture device 100 may detect the object 185 based on the AOLP values and/or DOLP values. In some embodiment, based on the depth information, the DOLP values, and/or the AOLP values, the polarization capture device 100 can extract or identify features of the object 185 more accurately. The identified features may include at least one of the shape, the size, the texture, the surface orientation, the surface roughness, the material of the object 185. Further, the polarization capture device 100 can identify various properties of the material of the object 185, such as the mechanical properties (e.g., stresses, flaws or defects), optical properties (e.g., reflection, transmission, diffraction, refraction, and/or scattering), and acoustic properties of the material.

In some embodiments, the feature extractor 170 may calculate a rate of change in at least one of the DOLP value, the AOLP value, the depth information, or a contour in a linear distance or an area. The rate of change may also be used to identify characteristics or features of the object. For example, the AOLP value may indicate whether the object is within a shadow. When there is a shadow in a scene, there may be a 90-degree change in the AOLP values in the corresponding neighboring pixels, resulting in a distinct rate of change in the AOLP values. Thus, based on the calculated rate of change in the AOLP values, the feature extractor 170 may identify that there is a shadow in the captured image of the scene and that the object is at least partially in the shadow.

At least one of the DOLP value, the AOLP value, or the depth information may relate to the reflection, scattering, diffraction, refraction, and/or transmission, and/or light absorption characteristics (i.e., optical properties) of the object 185. For the object 185, a specific irradiance may be a combination of an emitted light, a reflected light, a scattered light, a refracted light, a diffracted light, and/or a transmitted light, etc. The specific irradiance may also reflect whether a portion of the light has been absorbed by the object 185. Each of the emitted light, reflected light, scattered light, refracted light, diffracted light, and transmitted light may have a unique polarization signature. The total irradiance may be the sum of these lights. Based on the irradiance, the feature extractor 170 may determine the DOLP value, AOLP value, and the depth information, and/or the contour, which may be used to identify various features of the object.

In some embodiments, the storage device 105 may be a non-transitory computer-readable storage device. The storage device 105 may be coupled with the processor 155. In some embodiments, the storage device 105 may include a memory, a hard disk, an optical disk, or any other suitable data storage medium. The storage device 105 may be configured to store data or information, and/or instructions that may be executable by the processor 155. In some embodiments, the storage device 105 may be configured to store various data, such as the image data S120 and S121, the data S130 and S131, the data S140 and S141, the data S150 and S151, the data S160, and the data S190. In some embodiments, the storage device 105 may store computer-executable instructions or codes, which may be executed by the processor 155. When the instructions are executed by the processor 155, the processor 155 may perform various processes (e.g., computations) disclosed herein.

In some embodiments, the polarization capture device 100 may include the light source 180. In some embodiments, the light source 180 may be an NIR light source configured to emit a light having a wavelength range substantially matching the spectrum of the NIR polarized image sensors 120 and 121. In such embodiments, the first spectral filter 110 and the second spectral filter 111 may be omitted.

Figure 2:
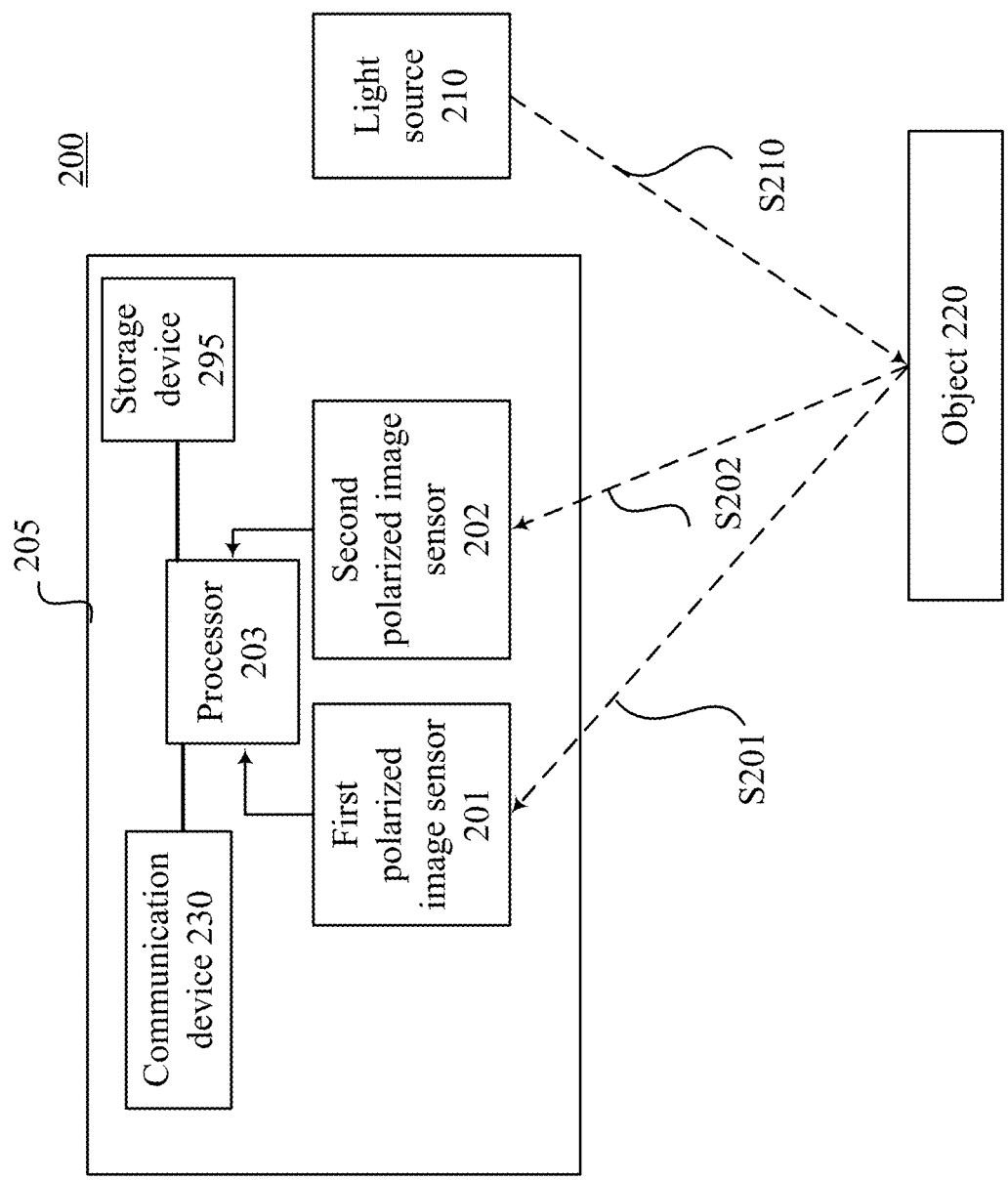
FIG. 2 illustrates a schematic diagram of a polarization capture system, according to an embodiment of the disclosure.

FIG. 2 illustrates a polarization capture system 200, according to an embodiment of the present disclosure. The polarization capture system 200 may include a polarization capture device 205. In some embodiments, the polarization capture system 200 may also include a light source 210. The polarization capture device 205 may include a first polarized image sensor 201, a second polarized image sensor 202, and a processor 203. The processor 203 may be an embodiment of the processor 155 shown in FIG. 1. The first polarized image sensor 201 and the second polarized image sensor 202 may be embodiments of the first polarized image sensor 120 and the second polarized image sensor 121 shown in FIG. 1, respectively. In some embodiments, the first polarized image sensor 201 and the second polarized image sensor 202 may be included in two separate cameras, and may be disposed apart from one another. In some embodiments, the first polarized image sensor 201 and the second polarized image sensor 202 may be included in a single camera, and may be disposed apart from one another. In some embodiments, the polarization capture device 205 may also include one or more optical lenses optically coupled to the respective polarized image sensor 201 or 202. In some embodiments, the polarization capture system 200 may include more than two polarized image sensors. The two or more polarized image sensors may be configured to capture two or more images (or sets of image data) of an object 220 from two or more different perspectives.

In some embodiments, the first polarized image sensor 201 and the second polarized image sensor 202 may be NIR polarized image sensors configured to capture NIR monochromatic images of the object 220 from two different perspectives. Although not shown in FIG. 2, the polarization capture device 205 may include a first spectral filter (e.g., similar to the first spectral filter 110) and a second spectral filter (e.g., similar to the spectral filter 111) optically coupled with the first polarized image sensor 201 and the second polarized image sensor 202, respectively, similar to the embodiment shown in FIG. 1. The spectral filter coupled to the respective polarized image sensor 201 or 202 may be an NIR optical filter configured to allow lights having wavelengths within a wavelength range substantially matching the spectrum range of the respective polarized image sensor 201 or 202 to pass through. The spectral filter may be disposed between the polarized image sensor 201 (or 202) and the optical lenses. In some embodiments, the light source 210 may be an NIR light source configured to emit lights having wavelengths within a wavelength range substantially matching the spectrum of the NIR polarized image sensors 201 and 202. In such embodiments, the spectral filter may be omitted.

In some embodiments, the polarization capture system 205 may include a storage device 295, which may be an embodiment of the storage device 105 shown in FIG. 1. In some embodiments, the polarization capture device 205 may also include a communication device 230 communicatively coupled with the processor 203. The communication device 230 may be configured to communicate with an external device through wired or wireless communication to exchange data. For example, in some embodiments, the communication device 230 may include a Universal Serial Bus ("USB") port, a Wi-Fi communication module (including an antenna), a Bluetooth communication module (including an antenna), etc. In some embodiments, the polarization capture device 205 may transmit image data and/or other data, such as extracted features of an object (e.g., the object 220) to an external device or computer, such as a remote server. In some embodiments, the polarization capture device 205 may receive data (e.g., commands, image data, operation parameters, etc.) from an external device or computer. In some embodiments, the polarization capture system 200 may enable offline machine learning, or artificial intelligence processing of data (e.g., image data) relating to the object 220. In some embodiments, data or information may be transmitted from the external device or computer to the polarization capture system 200, such as a table storing properties of materials (e.g., optical properties, acoustic properties, etc.), or previously identified features of various objects, which may be used in identifying features or properties of materials of the object. In some embodiments, the table storing optical properties of materials, or the previously identified features of various objects may be retrieved from the external device or computer through the communication device 230 and may be stored in the storage device 295. Although not shown in FIG. 1, a similar communication device may be included in the polarization capture device 100.

The light source 210 may be any light source, such as a nature light source (e.g., the sun), or a man-made light source (e.g., an LED, an OLED, or a laser diode). The light source 210 may be configured to emit a light S210 to illuminate the object 220. The light S210 may have a wavelength range at least covering predetermined wavelength bands or ranges (or predetermined spectrums) of the first polarized image sensor 201 and the second polarized image sensor 202. The light S210 may be reflected, scattered, diffracted, refracted, transmitted, and/or partially absorbed or polarized by the object 220, and may become lights S201 and S202 (for illustrative purposes, the lights S201 and S202 are shown as reflected lights). The first polarized image sensor 201 and the second polarized image sensor 202 may capture images of the object 220 based on the lights S201 and S202 received in different perspectives, respectively. The processor 203 may process the captured images to identify various features, characteristics, and/or properties of the object 220, similar to the processes described above in connection with FIG. 1.

Figure 3:
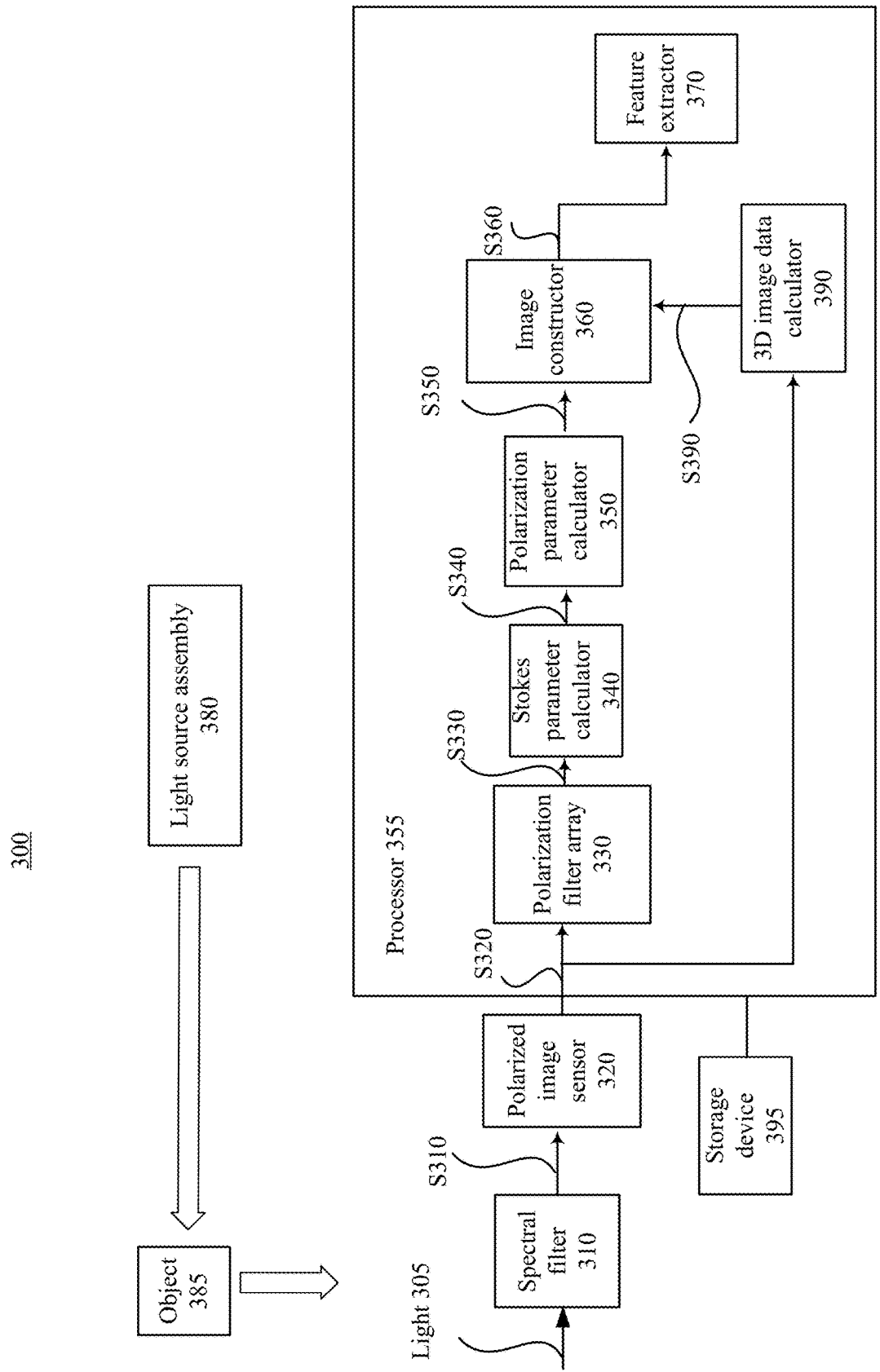
FIG. 3 illustrates a schematic diagram of a polarization capture device, according to another embodiment of the present disclosure.

FIG. 3 illustrates a schematic diagram of a polarization capture device or system 300, according to another embodiment of the present disclosure. The polarization capture system 300 may be configured to provide a structured light to illuminate an object, capture one or more images of the object illuminated by the structured light, process image data of the one or more images to obtain polarization information of the object, and identify features of the object including the material of the object. The polarization capture system 300 may also identify various mechanical, optical, or acoustic properties of the material of the object. The structure light illumination may refer to a light illumination having a predetermined pattern (e.g., a structured light pattern). The polarization capture device or system 300 may include elements that are the same as or similar to those included in the polarization capture device or system 100 shown in FIG. 1. Descriptions of the same or similar elements can refer to the descriptions rendered in connection with FIG. 1.

As shown in FIG. 3, the polarization capture system 300 may include a spectral filter 310, a polarized image sensor 320, a processor 355, and a light source assembly 380. The polarization capture system 300 may include other elements, such as a non-transitory computer-readable storage device 395 coupled with the processor 355. The light source assembly 380 may emit lights having wavelengths in a wavelength range at least covering predetermined wavelength bands or ranges (or predetermined spectrums) of the polarized image sensor 320. The light source assembly 380 may provide a structured light (e.g., a structured light pattern) to illuminate the object 385. In some embodiments, the light source assembly 380 may include a projector configured to project the structured light (e.g., the structured light pattern) to illuminate the surface of the object 385. The projector may include a self-emissive display panel or a display panel illuminated by an external light source. In some embodiments, the structured light pattern may include a series of striped lines, grids, or other suitable patterns.

The polarized image sensor 320 may be similar to the first polarized image sensor 120 or the second polarized image sensor 121 shown in FIG. 1. In some embodiments, the polarization capture system 300 may include one or more optical lenses coupled to the polarized image sensor 320 to focus lights from the object 385 onto the polarized image sensor 320. The polarized image sensor 320 may generate polarized image data S320. In some embodiments, the spectral filter 310 disposed between the polarized image sensor 320 and the optical lenses may be similar to the first spectral filter 110 or the second spectral filter 111 shown in FIG. 1. In some embodiment, the spectral filter 310 may be an NIR spectral filter, and the polarized image sensor 320 may be an MR polarized image sensor configured to capture monochromatic images of the object 385 based on lights in the NIR wavelength range. The filtered light output from the spectral filter 310 is denoted as S310. In some embodiments, the light source assembly 380 may be an NIR light source configured to emit lights having a wavelength range substantially matching the spectrum of the NIR polarized image sensor 320, and the spectral filter 310 may be omitted.

The processor 355 may be similar to the process 155 shown in FIG. 1. For example, the processor 355 may include a polarization filter array 330, a Stokes parameter calculator 340, a polarization parameter calculator 350, an image constructor 360, a 3D image data calculator 390, and a feature extractor 370. The polarization filter array 330, the Stokes parameter calculator 340, the polarization parameter calculator 350, the image constructor 360, and the feature extractor 370 may be similar to the polarization filter array 130, the Stokes parameter calculator 140, the polarization parameter calculator 150, the image constructor 160, and the feature extractor 170 shown in FIG. 1, respectively. The polarization filter array 330 may output filtered data S330. In some embodiments, the filtered data S330 may be polarized image data (e.g., polarized mono image data). The Stokes parameter calculator 340 may output data S340 including Stokes parameters. The polarization parameter calculator 350 may generate polarization parameter data S350 including one or more DOLP values and/or one or more AOLP values. The image constructor 360 may construct images and output constructed image data S360. The 3D image data calculator 390 may generate 3D image data S390 based on the polarized image data S320.

In some embodiment, the object 385 (e.g., a three-dimensional (3D) object) may be disposed at a reference plane with a predetermined distance D from the light source assembly 380. When the structured light pattern is projected onto the surface of the object 385, the structured light pattern may be distorted by the surface of the object 385. The polarized image sensor 320 may capture one or more images of the surface of the object 385, with the distortions in the structured light pattern. That is, the polarized image data S320 may reflect distortion in the structured light pattern. The captured images may be processed by the processor 355 (e.g., by one or more of the polarization filter array 330, the Stokes parameter calculator 340, the polarization parameter calculator 350, the image constructor 360, the feature extractor 370, and/or the 3D image data calculator 390). In some embodiments, a plurality of different structured light patterns may be time-sequentially or simultaneously projected onto the surface of the object 385, and the polarized image sensor 320 may capture one or more images of the surface of the object 385 illuminated by the respective structured light pattern. For example, in some embodiments, the 3D image data calculator 390 may calculate depth information based on the polarized image data that reflect distortion of the structured light pattern.

In some embodiments, the 3D image data calculator 390 may be configured to process the image data of the captured images (e.g., including data indicating the distortions in the structured light pattern), and determine spatial positions of various points at the surface of the object 385 with respect to the reference plane. Various techniques may be used to process the captured images to determine the spatial positions of the points at the surface of the object 385 with respect to the reference plane. Based on the determined spatial positions of the points at the surface of the object 385 with respect to the reference plane, 3D image data representing the surface of the object 385 may be generated. The 3D image data may include depth information of the object 385 in the captured images. In some embodiments, the 3D surface of the object 385 may be reconstructed based on the 3D image data.

In addition, the processor 355 may be configured to process (e.g., through the polarization parameter calculator 350) the image data of the captured images to obtain polarization information of the object 385, which may be similar to the process described above in connection with FIG. 1. The polarization information included in polarization parameter data S350 may include the DOLP values and/or the AOLP values. According to the polarization information and/or the 3D image data (which may include depth information) representing the object 385, various features or characteristics of the object 385, such as the shape, the size, the texture, the surface roughness, the surface orientation, the material of the object 385, etc., may be identified by the feature extractor 370. Further, optical, mechanical, and/or acoustic properties of the materials of the object 385 may also be identified by the feature extractor 370.

Figure 4:
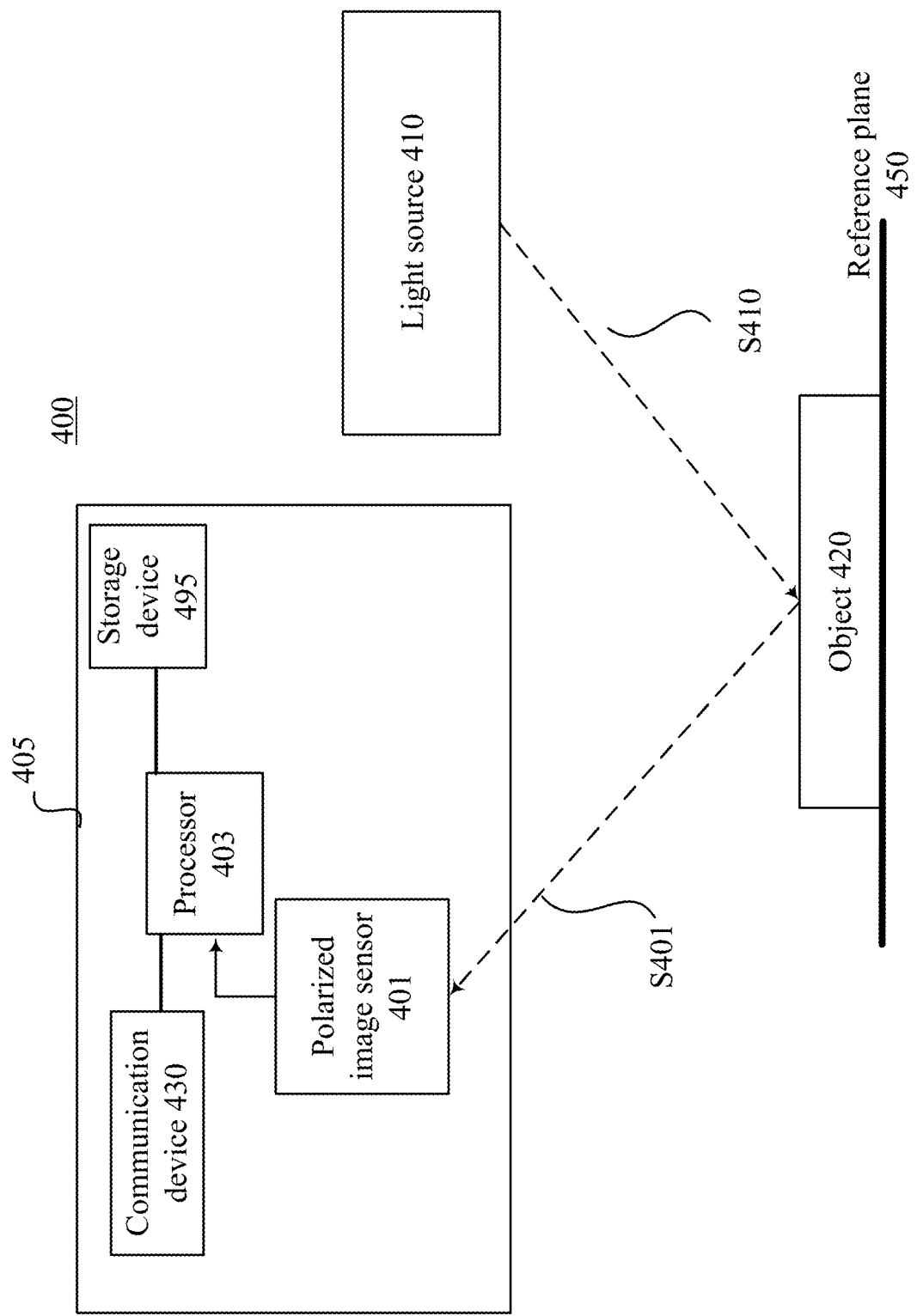
FIG. 4 illustrates a schematic diagram of a polarization capture system, according to another embodiment of the present disclosure.

FIG. 4 illustrates a schematic diagram of a polarization capture system 400, according to another embodiment of the disclosure. The polarization capture device system 400 may include elements that are the same as or similar to those included in the polarization capture system 200 shown in FIG. 2. Descriptions of the same or similar elements can refer to the descriptions rendered in connection with FIG. 2.

As shown in FIG. 4, the polarization capture system 400 may include a polarization capture device 405 and a light source or light source assembly 410. The polarization capture device 405 may include a polarized image sensor 401, a processor 403, a storage device 495, and a communication device 430. The processor 403 may be an embodiment of the processor 355 shown in FIG. 3. The polarized image sensor 401 may be embodiments of the polarized image sensor 320 shown in FIG. 3. In some embodiments, the polarization capture device 405 may also include one or more optical lenses optically coupled to the polarized image sensor 401. In some embodiments, the polarized image sensor 401 may be an NIR polarized image sensor configured to capture NIR monochromatic images of an object 420. Although not shown in FIG. 4, the polarization capture device 405 may include a spectral filter (e.g., similar to the spectral filter 310 shown in FIG. 3) optically coupled with the polarized image sensor 401, similar to the embodiment shown in FIG. 3. The spectral filter coupled to the polarized image sensor 401 may be an NIR optical filter configured to allow lights having wavelengths in a wavelength range substantially matching the spectrum range of the polarized image sensor 401 to pass through. The spectral filter may be disposed between the polarized image sensor 401 and the optical lenses. In some embodiments, the light source 410 may be an NIR light source configured to emit lights having a wavelength range substantially matching the spectrum of the NIR polarized image sensor 401. In such embodiments, the spectral filter may be omitted.

In some embodiments, the storage device 495 may be an embodiment of the storage device 395 shown in FIG. 3. In some embodiments, the communication device 430 may be similar to the communication device 230 shown in FIG. 2. The communication device 430 may be communicatively coupled with the processor 403. The communication device 430 may be configured to communicate with an external device through wired or wireless communication to exchange data. For example, in some embodiments, the communication device 430 may include a Universal Serial Bus ("USB") port, a Wi-Fi communication module (including an antenna), a Bluetooth communication module (including an antenna), etc. In some embodiments, the polarization capture device 405 may transmit image data and/or other data, such as extracted features of the object 420 to an external device or computer, such as a remote server. In some embodiments, the polarization capture device 405 may receive data (e.g., commands, image data, operation parameters, etc.) from an external device or computer. In some embodiments, the polarization capture system 400 may enable offline machine learning, or artificial intelligence processing of data (e.g., image data) relating to the object 420. In some embodiments, data or information may be transmitted from the external device or computer to the polarization capture system 400, such as a table storing properties of materials (e.g., optical properties, mechanical properties, acoustic properties, etc.), or previously identified features of various objects, which may be used in identifying features or properties of materials of the object 420. In some embodiments, the table storing properties of materials or the previously identified features of various objects may be retrieved from the external device or computer through the communication device 430 and may be stored in the storage device 495.

The light source 410 may be a structured light source configured to emit a structured light (e.g., a structured light pattern) S410 to illuminate the object 420. The structured light (e.g., a structured light pattern) S410 may have a wavelength within a wavelength range at least covering predetermined wavelength bands or ranges (or predetermined spectrums) of the polarized image sensor 401. In some embodiments, the light source 410 may include a projector configured to project the structured light (e.g., the structured light pattern) S410 to illuminate the surface (e.g., 3D surface) of the object 420. In some embodiments, the structured light pattern may include a series of striped lines, grids, or other suitable patterns.

In some embodiments, as shown in FIG. 4, the light source 410 and the polarization capture device 405 may be disposed at the same side of the object 420. In some embodiments, the object 420 may be disposed at the reference plane 450 with a predetermined distance D from both the light source 410 and the polarization capture device 405, or at least one of the light source 410 or the polarization capture device 405.

When the structured light pattern is projected onto the surface of the object 420, the structured light pattern may be distorted by the surface of the object 420. The structured light S410 may be reflected, scattered, diffracted, refracted, transmitted, and/or partially absorbed by the object 420, and may become a light S401 (for illustrative purposes, the light S401 is shown as a reflected light). The polarized image sensor 401 may capture images of the object 420 based on the light S401, with the distortions in the structured light pattern. In some embodiments, the light source 410 may be configured to project a plurality of different structured light patterns onto the surface of the object 420, time-sequentially or simultaneously. The polarized image sensor 401 may capture one or more images of the surface of the object 385 illuminated by the respective structured light pattern. The captured images may be processed by the processor 403 to obtain polarization information and/or the 3D image data of the object 420. According to the polarization information and/or the 3D image data representing the object 420, various features or characteristics of the object 385, such as the shape, the size, the texture, the surface orientation, the surface roughness, the material of the object 420, etc., may be identified by the processor 403.

Figure 5:
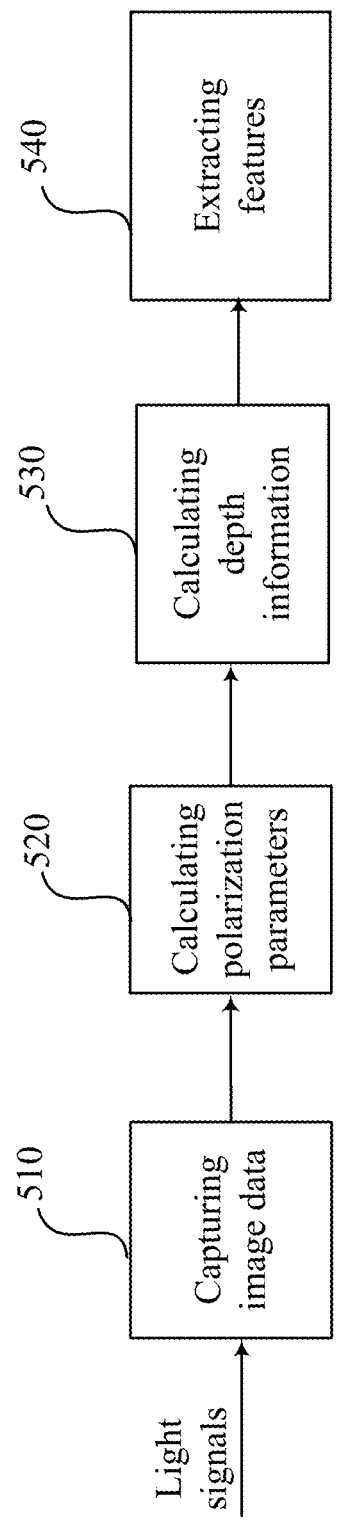
FIG. 5 is a schematic illustration of a method executed by a polarization capture device or system, according to an embodiment of the disclosure.

FIG. 5 schematically illustrates a flowchart showing the image capturing and processing processes disclosed herein. The processes may be executed or performed by the polarization capture device or system disclosed herein. The processes (or method) may include capturing image data (step 510). In some embodiments, two polarized image sensors (e.g., those shown in FIG. 1 and FIG. 2) may capture two sets of image data or images of an object from different perspectives. The processes (or method) may also include calculating polarization parameters (step 520). For example, DOLP and/or AOLP values may be calculated based on the captured image data. In some embodiments, the processes (or method) may also include calculating depth information (step 530). In some embodiments, the depth information of the object may be calculated based on the disparity information or the parallax information of the object in the two sets of image data or images. The processes (or method) may also include extracting features (step 540). Features or characteristics of the object may be extracted based on the calculated polarization parameters and/or depth information. The features or characteristics of the object may include the shape, the size, the texture, the surface roughness, the surface orientation, the material of the object, etc.

In some embodiments, one or more steps in the processes (or method) may be omitted. For example, step 530 may be omitted. In some embodiments, the processes (or method) may also include additional steps. For example, the processes (or method) may also include constructing images based on the calculated Stokes parameters, polarization parameters, and/or depth information, such as an $S_0$ image, an $S_1$ image, an $S_2$ image, an $S_3$ image, an AOLP image, an DOLP image, a 3D image of the object, etc. In some embodiments, the processes (or method) may also include properties of the material of the object, such as the mechanical properties (e.g., stress, flaws or defects), optical properties (e.g., reflection, diffraction, refraction, transmission, and/or scattering), acoustic properties, etc.

In some embodiments, in step 510, a single polarized image sensor (e.g., the polarized image sensor 320 shown in FIG. 3 or the polarized image sensor 401 shown in FIG. 4) may capture a set of image data or images of a surface of an object under a structured light illumination. In some embodiments, step 530 may be omitted, and the processes (or method) may also include calculating 3D image data of the surface of the object based on image data of the surface of the object captured under the structured light illumination. In step 540, features or characteristics of the object may be extracted based on the calculated polarization parameters and/or the 3D image data. In some embodiments, the processes (or method) may also include constructing images based on the calculated polarization parameters, and/or the 3D image data, such as an AOLP image of the object, an DOLP image of the object, a 3D image of the object, etc.

Polarization capture devices or systems in accordance with various embodiments of the present disclosure have various applications in a number of fields, which are all within the scope of the present disclosure. For example, such polarization capture devices or systems may be implemented in other systems for target detection and identification, materials inspection, stress inspection and visualization, defects detection, image contrast enhancement, transparent objects detection, surface reflection reduction, depth mapping, 3D surface reconstruction, robotic vision, biology, etc. Some exemplary implementations of the polarization capture devices or systems in near-eye displays ("NEDs") will be explained below. NEDs have been widely used in a large variety of applications, such as aviation, engineering, science, medicine, computer gaming, video, sports, training, and simulations. One application of NEDs is to realize augmented reality ("AR"), virtual reality ("VR"), mixed reality ("MR)", or a combination thereof.

Figure 6A:
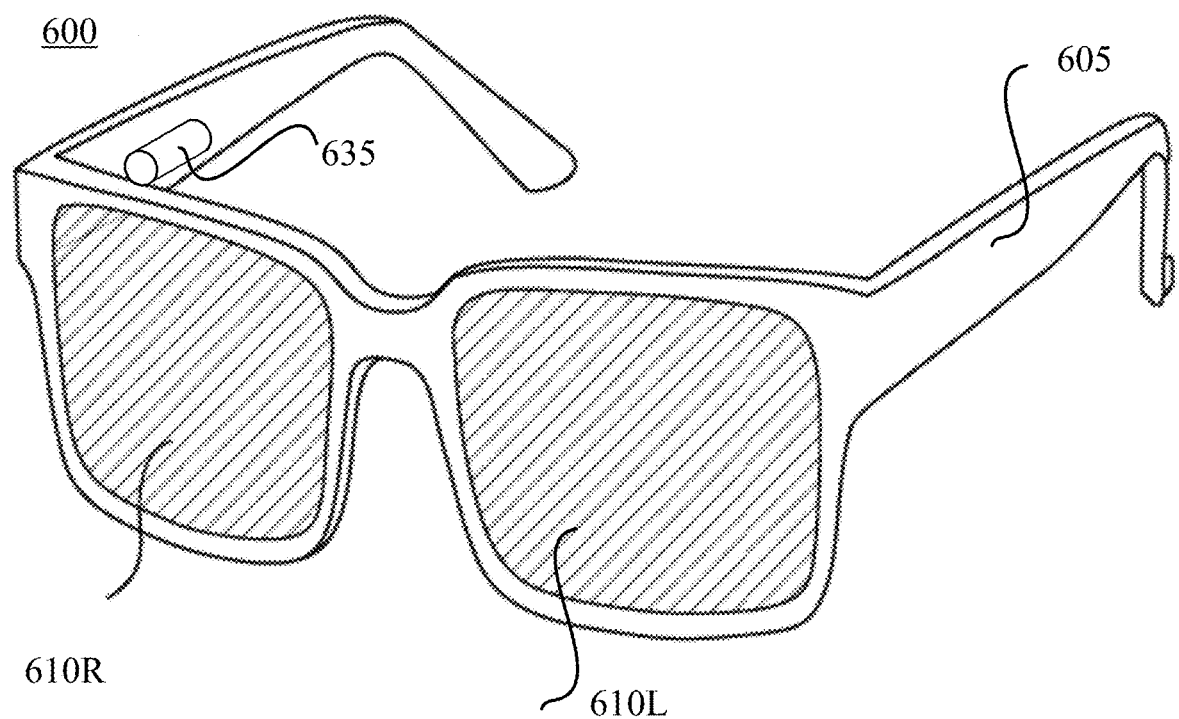
FIG. 6A illustrates a schematic diagram of a near-eye display ("NED") including a polarization capture device, according to an embodiment of the present disclosure.

FIG. 6A illustrates a schematic diagram of an NED 600 according to an embodiment of the disclosure. In some embodiments, the NED 600 may be referred to as a head-mounted display ("HMD"). The NED 600 may be configured to present media content to a user. Examples of media content presented by the NED 600 may include one or more images, video, audio, or a combination thereof. In some embodiments, audio is presented via an external device (e.g., speakers and/or headphones). The NED 600 may function as a VR device, an AR device, an MR device, or a combination thereof. In some embodiments, when the NED 600 may function as an AR or an MR device, portions of the NED 600 and its internal components may be at least partially transparent.

As shown in FIG. 6A, the NED 600 may include a frame 610, a left display system 620L, and a right display system 620R. In some embodiments, one or more devices shown in FIG. 6A may be omitted. In some embodiments, one or more additional devices or components not shown in FIG. 6A may also be included in the NED 600. The frame 610 may include a suitable type of mounting structure configured to mount the left display system 620L and the right display system 620R to a body part (e.g. a head) of the user (e.g., adjacent eyes of the user). The frame 610 may be coupled to one or more optical elements, which may be configured to display media content to the user. In some embodiments, the frame 610 may represent a frame of eye-wear glasses. The left display system 620L and the right display system 620R may be configured to enable the user to view virtual content presented by the NED 600 and/or to view images of real-world objects. For example, in some embodiments, each of the left display system 620L and the right display system 620R may include a see-through optical element. In some embodiments, the left display system 620L and the right display system 620R may include any suitable display assembly (not shown) configured to generate an image light (representing a virtual image) and to direct the image light to an eye of the user. In some embodiments, the left display system 620L and the right display system 620R may each include a light source assembly 635 configured to generate a virtual image (or an image light).

Figure 6B:
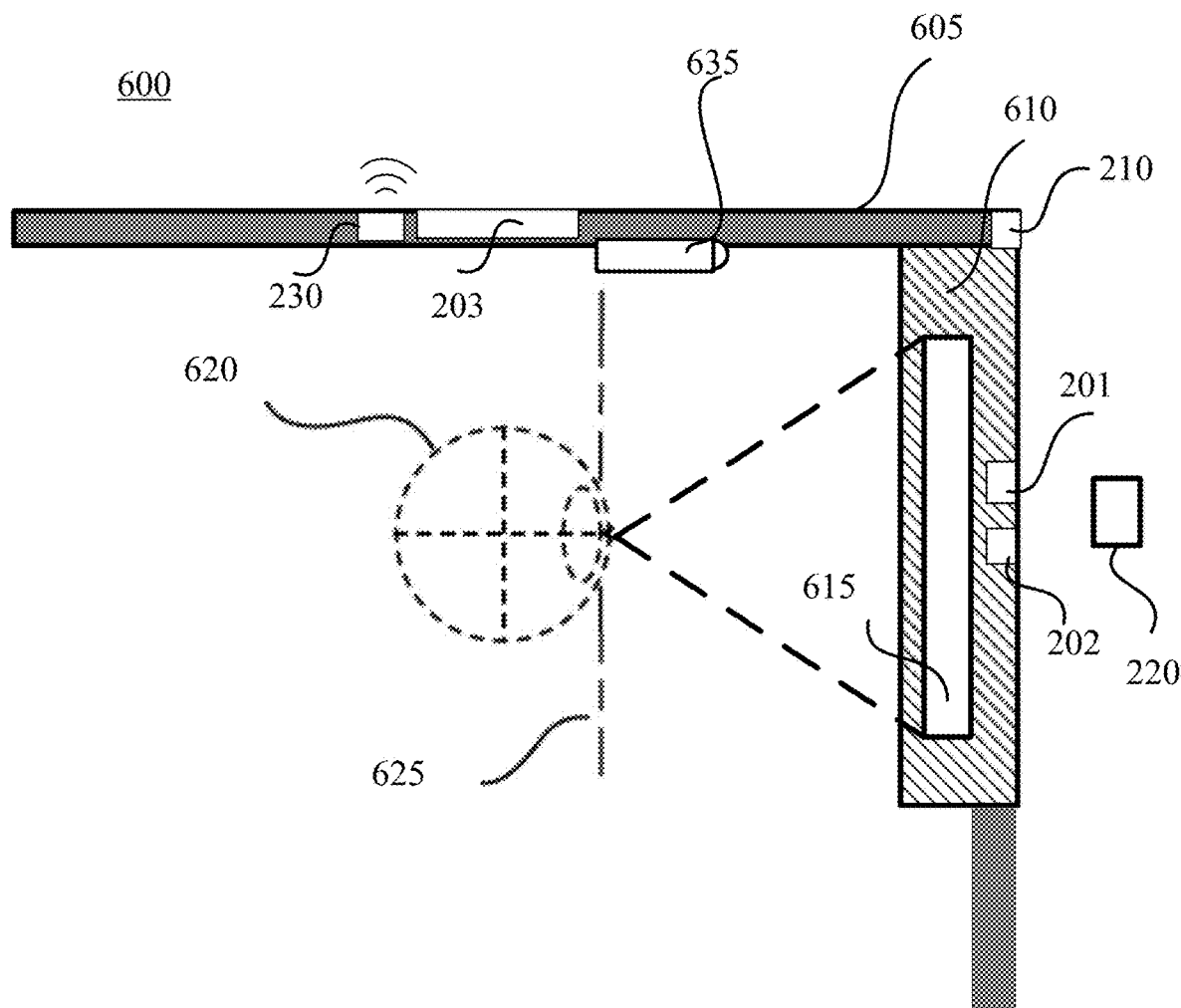
FIG. 6B illustrates a schematic diagram of a cross section view of a half of the NED shown in FIG. 6A, according to an embodiment of the present disclosure.

FIG. 6B is a cross-section view of a half of the NED 600 shown in FIG. 6A according to an embodiment of the disclosure. For purposes of illustration, FIG. 6B shows the cross-sectional view associated with the left display system 620L of the NED 600. The cross-sectional view of the right display system 620R may be similar to the cross-sectional view associated with the left display system 620L. As shown in FIG. 6B, for an eye 620, the left display system 620L may include the light source assembly 635 for generating an image light (e.g., a visible image light representing a virtual image) and a light guide (or waveguide) display assembly 615 for delivering the image light generated by the light source assembly 635 to the eye 620. An exit pupil 625 may be a location where the eye 620 is positioned in an eye-box region when the user wears the NED 600.

In some embodiment, the light source assembly 635 may include a light source (e.g., a projector) configured to emit the image light and an optical conditioning device configured to condition (e.g., including collimating, polarizing, etc.) the image light. In some embodiments, the light guide display assembly 615 may include a light guide or a stack of light guides. The light guide display assembly 615 may also include one or more in-coupling elements coupled to the light guide(s) and configured to couple the image light generated by the light source assembly 635 into a total internal reflection ("TIR") path inside the light guide(s). The light guide display assembly 615 may also include one or more out-coupling elements coupled to the light guide(s) and configured to couple the image light propagating in the TIR path out of the light guide(s), toward the eye 620. For illustrative purposes, FIG. 6B shows the cross-sectional view associated with a single eye 620 and a single light guide display assembly 615. In some embodiments, another light guide display assembly that is separate from and similar to the light guide display assembly 615 shown in FIG. 6B may be included in the NED 600 to provide an image light to an exit pupil of another eye of the user. In some embodiments, a light source assembly similar to the light source assembly 635 may be disposed at the other half of the NED 600.

The NED 600 may include one or more optical elements between the light guide display assembly 615 and the eye 620. The optical elements may be configured to, e.g., correct aberrations in an image light emitted from the light guide display assembly 615, magnify an image light emitted from the light guide display assembly 615, or perform another type of optical adjustment to an image light emitted from the light guide display assembly 615. The NED 600 may include a polarization capture device or system in accordance with an embodiment of the present disclosure, such as the polarization capture device or system 100 shown in FIG. 1, or the polarization capture device or system 200 shown in FIG. 2. The polarization capture device or system may include two or more polarized image sensors (e.g., the first polarized image sensor 201 and the second polarized image sensor 202), a communication device (e.g., the communication device 230), a processor (e.g., the processor 203), and a storage device (not shown in FIG. 6B). In some embodiments, the polarization cameras or polarized image sensors 201 and 202 may be disposed at a side of the light guide display assembly 615 facing an object 220 in the real world. The polarized image sensors 201 and 202 may be configured to capture two or more images (i.e., image data representing the two or more images) of the object 220 or a scene including the object 220 from two or more different perspectives. The processor 203 may process the captured image data to obtain the depth information and/or the polarization information (e.g., polarization parameters) of the object 220. The processor 203 may exact various features or characteristics (e.g., material, shape, etc.) of the object 220, and identify various properties of the object 220. Information regarding the extracted or identified features of the object 220, including various properties of the material of the object 220, may be presented to the user via the display system 610L. For example, the information relating to the object 220 obtained by the processor 203 may be transmitted to the light source assembly 635, which may generate an image light including a presentation of the information relating to the object 220. The image light including the presentation of the information relating to the object 220 may be displayed to the eye 620 through the light guide display assembly 615. In some embodiments, the presentation of the information relating to the object 220 may be superimposed on an image of the object 220, and both of the image of the object 220 and the presentation of the information may be presented to the eye 620. Therefore, the eye 620 may view both an image of the object 220 in the real world, and information relating to the object 220 extracted by the processor 203 based on image data obtained by the polarized image sensors 201 and 202. In some embodiments, the polarization capture device or system may also include a light source (e.g., the NIR light source 210) configured to emit a light to illuminate the object 220. The polarized image sensors 201 and 202 may capture image data of the object 220 based on the light reflected, diffracted, transmitted, refracted, or scattered from the object 220 under the illumination.

Figure 6C:
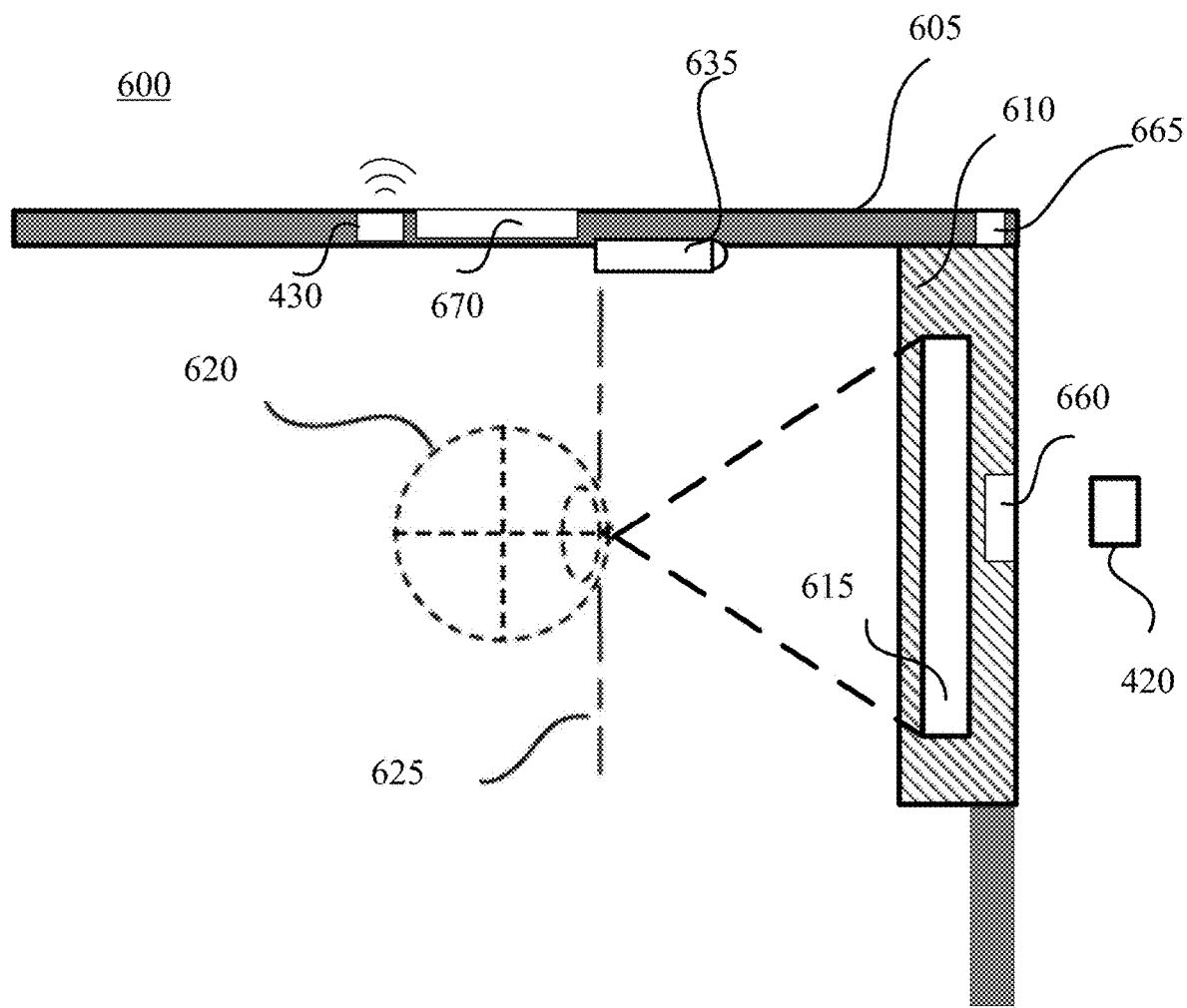
FIG. 6C illustrates a schematic diagram of a cross section view of a half of the NED shown in FIG. 6A, according to another embodiment of the present disclosure.

FIG. 6C illustrates a schematic diagram of a cross section view of a half of the NED shown in FIG. 6A, according to another embodiment of the present disclosure. The left half of the NED shown in FIG. 6C may include elements that are the same as or similar to those included in left half of the NED shown in FIG. 6B. Descriptions of the same or similar elements can refer to the descriptions rendered in connection with FIG. 6B. As shown in FIG. 6C, the NED 600 may include a polarization capture device or system in accordance with an embodiment of the present disclosure, such as the polarization capture device or system 300 shown in FIG. 3, or the polarization capture device or system 400 shown in FIG. 4. The polarization capture device or system may include a polarized image sensor 660 (which may be the polarized image sensor 320 or the polarized image sensor 401), a light source assembly 665 (which may be the light source assembly 380 or 410), a communication device (e.g., the communication device 430), a processor 670 (which may be the processor 303 or the processor 403), and a storage device (not shown in FIG. 6C). In some embodiments, the polarized image sensor 660 may be disposed at a side of the light guide display assembly 615 facing an object 420 in the real world. The light source assembly 665 may provide a structured light (e.g., a structured light pattern) to illuminate a surface of the object 420 disposed at a reference plane. The polarized image sensor 660 may be configured to capture one or more images (i.e., image data representing the one or more images) of the object 420 or a scene including the object 420 under the structured light pattern. The processor 670 may process the captured image data to obtain the polarization information (e.g., polarization parameters) and 3D image data of the object 420. The processor 670 may extract various features or characteristics of the object 420 based on the obtained polarization information (e.g., polarization parameters) and/or 3D image data of the object 420. In some embodiments, the processor 670 may further identify various mechanical, optical, and/or acoustic properties of the material of the object 420 based on the extracted features or characteristics of the object 420. Information regarding the extracted or identified features and/or the various properties of the object 420 may be presented to the user via the display system 610L, similar to the manner described above in connection with FIG. 6B.

FIG. 7 schematically illustrate an exploded view of a polarized image sensor 700. In some embodiments, the polarized image sensor 700 may also be referred to as a pixelated polarized image sensor. In some embodiments, the polarized image sensor 700 may be included in or may be an embodiment of the first polarized image senor 120 shown in FIG. 1, the second polarized image sensor 121 shown in FIG. 1, the first polarized image sensor 201 shown in FIG. 2, the second polarized image sensor 202 shown in FIG. 2, the polarization image sensor 320 shown in FIG. 3, or the polarized image sensor 401 shown in FIG. 4.

The polarized image sensor 700 may include a microlens array 720, a polarizer array 730, and a photo diode (or pixel)

array 740 aligned and stacked together. The microlens array 720 may also be referred to as an on-chip microlens array. The polarizer array 730 may also be referred to as a pixel-level micro-polarizer array. The microlens array 720 may include a plurality of lenses 725 arranged in a matrix or array configuration. The polarizer array 730 may include a plurality of polarization selective structures 735 (each functions as a micro-polarizer) arranged corresponding to the arrangement of the plurality of lenses in the microlens array 720. Each of the polarization selective structures 735 may be configured with a predetermined polarization axis orientation, such that a light of a predetermined polarization may transmit through the polarization selective structure, whereas lights of other polarizations may be blocked.

For example, FIG. 7 shows that the polarizer array 730 may include a plurality of 2×2 arrays. Each 2×2 array may include a polarizer 735-$a$ with a vertical polarization axis orientation (or direction) (i.e., a 90-degree polarization axis orientation), a polarizer 735-$b$ with a 45-degree polarization axis orientation, a polarizer 735-$c$ with a 135-degree (or −45-degree) polarization axis orientation, and a polarizer 735-$d$ with a horizontal polarization axis orientation (i.e., a 0-degree polarization axis orientation). In some embodiments, the polarizer array 730 may include pixelated wire-grid polarizers. The photo diode (or pixel) array 740 may include a plurality of photo diodes 745 arranged corresponding to the arrangement of the plurality of polarization selective structures 735 to receive the light transmitted through the corresponding polarization selective structures 735 (e.g., polarized light). In some embodiments, the plurality of photo diodes 745, the plurality of polarization selective structures 735, and the plurality of lenses 725 may have a one-to-one correspondence. With the polarized image sensor 700, each photo diode 745 may only receive a light of a predetermined polarization corresponding to the predetermined polarization axis orientation of the polarizer coupled to the photo diode 745. Various polarization parameters may be obtained by a processor based on the received lights of different polarizations.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive. The disclosed embodiments described in the specification and/or shown in the drawings be combined in any suitable manner. For example, elements shown in one embodiment (e.g., in one figure) but not another embodiment (e.g., in another figure) may nevertheless be included in the other embodiment. Elements shown in one embodiment (e.g., in one figure) may be repeated to form a stacked configuration. Elements shown in different embodiments (e.g., in different figures) may be combined to form a variation of the disclosed embodiments. Elements shown in different embodiments may be repeated and combined to form variations of the disclosed embodiments. Elements mentioned in the descriptions but not shown in the figures may still be included in a disclosed embodiment or a variation of the disclosed embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a first polarized image sensor configured to capture first image data relating to an object from a first perspective;
a second polarized image sensor configured to capture second image data relating to the object from a second perspective different from the first perspective,
wherein at least one of the first polarized image sensor or the second polarized image sensor includes a microlens array, a micro-polarizer array, and a photo diode array arranged in a stacked configuration, and at least one of the first polarized image sensor or the second polarized image sensor processes a light from the object using the micro-polarizer array and generates at least one of the first image data or the second image date based on the light processed by the micro-polarizer array; and
a processor configured to obtain polarization information and depth information of the object based on at least one of the first image data or the second image data, and to extract a feature of the object based on the polarization information and the depth information,
wherein the processor includes a polarization filter array including a plurality of polarization filters configured to filter, based on one or more polarization orientations, at least one of the first image data generated by the first polarized image sensor or the second image data generated by the second polarized image sensor, and to output polarized image data for calculating one or more Stokes parameters,
wherein the polarization information includes angle of linear polarization ("AOLP") values,
wherein the processor is configured to calculate a rate of change in the AOLP values based on the first image data and the second image data, and extract the feature of the object based on the rate of change in the AOLP values.

2. The device of claim 1, wherein at least one of the first polarized image sensor or the second polarized image sensor is a near infrared ("NIR") polarized image sensor, and at least one of the first image data or the second image data is NIR monochromatic image data.

3. The device of claim 1, further comprising a light source configured to emit a near infrared light to illuminate the object.

4. The device of claim 1, wherein the polarization information also includes at least one of the one or more Stokes parameters, or degree of linear polarization ("DOLP") values.

5. The device of claim 4, wherein the processor is configured to extract the feature of the object also based on at least one of the one or more Stokes parameters, the DOLP values, or the depth information.

6. The device of claim 1, wherein the processor is further configured to calculate the one or more Stokes parameters based on the polarized image data.

7. The device of claim 4, wherein the processor is further configured to calculate at least one of the AOLP values or the DOLP values based on the one or more Stokes parameters.

8. The device of claim 4, wherein the processor is further configured to construct an image based on at least one of a plurality of Stokes parameter values, the DOLP values, the AOLP values, or the depth information.

9. The device of claim 1, wherein the processor is further configured to determine a material of the object, and identify an acoustic property of the material of the object.

10. A device, comprising:
a polarized image sensor configured to obtain image data relating to an object illuminated by a structured light, wherein the polarized image sensor includes a microlens array, a micro-polarizer array, and a photo diode array arranged in a stacked configuration, and the polarized image sensor is configured to process the structured light reflected from the object using the micro-polarizer array and to generate the image data based on the structured light processed by the micro-polarizer array; and
a processor configured to obtain polarization information of the object based on the image data, and to extract a feature of the object based on the polarization information, the processor including a polarization filter array including a plurality of polarization filters configured to filter, based on one or more polarization orientations, the image data generated by the polarized image sensor, and to output polarized image data for calculating one or more Stokes parameters,
wherein the polarization information includes angle of linear polarization ("AOLP") values,
wherein the processor is configured to calculate a rate of change in the AOLP values based on the image data, and extract the feature of the object based on the rate of change in the AOLP values.

11. The device of claim 10, further comprising:
a light source configured to emit the structured light.

12. The device of claim 10, wherein the polarized image sensor is a near infrared polarized image sensor, and the image data are monochromatic image data.

13. The device of claim 10, wherein the processor is further configured to determine a material of the object, and identify an acoustic property of the material of the object.

14. A method, comprising:
processing, by a first polarized image sensor including a microlens array, a micro-polarizer array, and a photo diode array arranged in a stacked configuration, a first light from an object;
generating, by the first polarized image sensor, first image data relating to the object from a first perspective based on the first light that has been processed by the micro-polarizer array included in the first polarized image sensor;
processing, by a second polarized image sensor including a microlens array, a micro-polarizer array, and a photo diode array arranged in a stacked configuration, a second light from the object;
generating, by a second polarized image sensor, second image data relating to the object from a second perspective different from the first perspective based on the second light that has been processed by the micro-polarizer array included in the second polarized image sensor;
obtaining, by a processor, polarization information and depth information of the object based on at least one of the first image data or the second image data; and
extracting, by the processor, a feature of the object based on the polarization information and the depth information of the object,
wherein the processor includes a polarization filter array including a plurality of polarization filters, and
wherein obtaining the polarization information and the depth information of the object includes filtering, by the polarization filter array included in the processor, the first image data and the second image data based on one or more polarization orientations, and outputting polarized image data for calculating one or more Stokes parameters, wherein the polarization information includes angle of linear polarization ("AOLP") values, wherein obtaining the polarization information includes calculating, by the processor, a rate of change in the AOLP values based on the first image data and the second image data, and extracting the feature of the object based on the rate of change in the AOLP values.

15. The method of claim 14, wherein extracting the feature of the object based on the polarization information and the depth information of the object comprises:

determining a material of the object, and wherein the method further comprises identifying an acoustic property of the material of the object.

16. The method of claim 14, wherein extracting the feature of the object based on the polarization information and the depth information of the object comprises determining a material of the object, and wherein the method further comprises identifying an acoustic property of the material of the object.

17. The method of claim 14, wherein the polarization information also includes at least one of the one or more Stokes parameters, or degree of linear polarization ("DOLP") values.

18. The method of claim 17, further comprising:

calculating, by the processor, the one or more Stokes parameters based on the polarized image data; and calculating, by the processor, at least one of the AOLP values or the DOLP values based on the one or more Stokes parameters.

19. The device of claim 1, further comprising:

a first spectral filter and a second spectral filter disposed in front of the first polarized image sensor and the second polarized image sensor, respectively, wherein each of the first and second spectral filters is a near infrared band-pass filter associated with a same predetermined wavelength range.

\* \* \* \* \*